US008942235B1

(12) United States Patent
Vinapamula Venkata

(10) Patent No.: US 8,942,235 B1
(45) Date of Patent: Jan. 27, 2015

(54) LOAD BALANCING DETERMINISTIC NETWORK ADDRESS TRANSLATION ACROSS SESSION MANAGEMENT MODULES

(75) Inventor: Suresh Kumar Vinapamula Venkata, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 143 days.

(21) Appl. No.: 13/350,545

(22) Filed: Jan. 13, 2012

Related U.S. Application Data

(60) Provisional application No. 61/556,003, filed on Nov. 4, 2011.

(51) Int. Cl.
*H04L 12/56* (2006.01)
*H04L 12/28* (2006.01)

(52) U.S. Cl.
USPC .......................... 370/392; 370/401; 370/254

(58) Field of Classification Search
None
See application file for complete search history.

(56) References Cited

U.S. PATENT DOCUMENTS

| 6,006,269 | A  | 12/1999 | Phaal |
| 6,571,287 | B1 | 5/2003  | Knight et al. |
| 7,058,973 | B1 | 6/2006  | Sultan |
| 7,184,437 | B1 | 2/2007  | Cole et al. |
| 7,194,767 | B1 | 3/2007  | Boydstun et al. |
| 7,346,044 | B1 | 3/2008  | Chou et al. |
| 8,274,979 | B2 | 9/2012  | Bragagnini et al. |
| 8,553,542 | B1 | 10/2013 | Szabo et al. |
| 8,656,052 | B2 | 2/2014  | Carothers |

| 2002/0138622 | A1 |    | 9/2002  | Dorenbosch et al. |
| 2006/0248581 | A1 |    | 11/2006 | Sundarrajan et al. |
| 2007/0043876 | A1 |    | 2/2007  | Varga et al. |
| 2007/0162968 | A1 |    | 7/2007  | Ferreira et al. |
| 2008/0013524 | A1 |    | 1/2008  | Hwang et al. |
| 2008/0044181 | A1 |    | 2/2008  | Sindhu |
| 2008/0107112 | A1 | *  | 5/2008  | Kuo et al. ............... 370/392 |
| 2009/0109983 | A1 | *  | 4/2009  | Dixon et al. ............ 370/401 |
| 2009/0129301 | A1 |    | 5/2009  | Belimpasakis |
| 2009/0135837 | A1 |    | 5/2009  | Mohaban |

(Continued)

OTHER PUBLICATIONS

Diel et al., "Characterizing TCP Resets in Established Connections," Computer Science Department Technical Report, Sep. 10, 2008, 10 pp.

(Continued)

*Primary Examiner* — Ayaz Sheikh
*Assistant Examiner* — Mariela Vidal Carpio
(74) *Attorney, Agent, or Firm* — Shumaker & Sieffert, P.A.

(57) ABSTRACT

Techniques are described for load-balancing deterministic NAT functions in a mobile gateway or other device in which subscriber sessions are distributed across a plurality of session management cards. Each of the session management cards may host a non-contiguous set of public addresses and a non-contiguous set of private network addresses associated with the subscriber sessions. To facilitate deterministic NAT under such conditions, each of the session management cards locally maps the non-contiguous set of public network addresses to an internal contiguous sequence of identifiers for the public addresses and maps the non-contiguous set of private network addresses to an internal contiguous sequence of identifiers for the private addresses. Each of the session management cards may then perform deterministic NAT on packets based on the contiguous sequence of identifiers for the public addresses and the contiguous sequence of identifiers for the private addresses internal to the session management card.

18 Claims, 6 Drawing Sheets

(56) References Cited

U.S. PATENT DOCUMENTS

| | | | |
|---|---|---|---|
| 2010/0153560 | A1 | 6/2010 | Capone et al. |
| 2010/0175123 | A1 | 7/2010 | Karino et al. |
| 2011/0047256 | A1 | 2/2011 | Babu et al. |
| 2011/0196945 | A1 | 8/2011 | Alkhatib et al. |
| 2011/0219123 | A1 | 9/2011 | Yang et al. |
| 2011/0249682 | A1* | 10/2011 | Kean et al. ............... 370/401 |
| 2012/0023257 | A1 | 1/2012 | Vos et al. |
| 2012/0110194 | A1 | 5/2012 | Kikkawa et al. |
| 2013/0054762 | A1 | 2/2013 | Asveren |
| 2013/0067110 | A1* | 3/2013 | Sarawat et al. ............ 709/238 |
| 2013/0103904 | A1* | 4/2013 | Pangborn et al. .......... 711/118 |
| 2013/0166763 | A1 | 6/2013 | Forsback |

OTHER PUBLICATIONS

Nilsson et al., "Fast Address Lookup for Internet Routers," Proceedings of Algorithms and Experiments, Feb. 9-11, 1998, pp. 9-18.

Penno et al., "Network Address Translation (NAT) Behavioral Updates," Internet-draft update: 4787-5382-5508, draft-penno-behave-rfc4787-5382-5508-bis-02, Nov. 16, 2011, 11 pp.

U.S. Appl. No. 13/172,556, filed Jun. 29, 2011 entitled Mobile Gateway Having Decentralized Control Plane for Anchoring Subscriber Sessions.

U.S. Appl. No. 61/054,692, filed May 20, 2008 entitled Streamlined Packet Forwarding Using Dynamic Filters for Routing and Security in a Shared Forwarding Plane.

U.S. Appl. No. 13/326,903, filed Dec. 15, 2011 entitled Determining Networking Address and Port Translation.

Donley et al. "Deterministic Address Mapping to Reduce Logging in Carrier Grade NATs draft-donley-behave-deterministic-cgn—00" Network Working Group, Internet-Draft, IETF Trust, Sep. 26, 2011, 10 pgs.

Gont, "TCP's reaction to soft errors," RFC 5461, Feb. 2009, 12 pp.

* cited by examiner

LOAD BALANCING DETERMINISTIC NETWORK ADDRESS TRANSLATION ACROSS SESSION MANAGEMENT MODULES

The application claims the benefit of U.S. Provisional Patent Application No. 61/556,003, filed Nov. 4, 2011, the entire contents of which are incorporated herein by reference.

TECHNICAL FIELD

The invention relates to computer networks and, more particularly, to network address translation in computer networks.

BACKGROUND

A computer network generally includes a number of interconnected network devices. Large networks, such as the Internet, typically include a number of interconnected computer networks, which in this context are often referred to as sub-networks or subnets. These subnets are each assigned a range of network addresses that can be allocated to the individual network devices that reside in the respective subnet. A server in each subnet may be responsible for allocating these network addresses in accordance with a network address allocation protocol, such as a dynamic host configuration protocol (DHCP).

Service provider networks typically assign private network addresses to the subscriber equipment (e.g., cable modems, DLS modems, mobile devices) utilized by their customers. For example, a DHCP server or Radius server may dynamically assign a private address to a subscriber equipment upon establishing a network connection for the subscriber equipment. When not in use, the network connection is torn down and the private address is returned to a pool of provider addresses utilized within the service provider network. These private addresses are not routable outside the service provider network. Instead, a network address translation (NAT) device translates the private addresses currently used by each subscriber equipment to public network addresses that are routable within a public network, such as the Internet.

Service providers are often required to be able to identify a particular customer that is associated with particular network traffic. For example, service provides are typically required to maintain information such that any give network address that sourced or received certain traffic can be traced back to the particular customer. As a result, service providers typically maintain archives of NAT system log files ("syslog"). Each syslog file stores potentially a significant amount of information including the private source IP address, the private source port, any VPN information of the subscriber, tunneling information, any NAT rules/terms, public IP address and port assigned to the subscriber, and the like.

The service providers are typically required to store this information for months or years to meet law enforcement requirements. This can present significant challenges and burdens in certain environments, such as large service provider networks where session setup rate is typically very high with tens of thousands of sessions being established and torn down each day. Generating syslogs with NAT translation information in such an environment, referred to as Carrier Grade NAT (CGN), for each and every session during the setup and teardown consumes resources on the NAT device, network bandwidth and also resources on the servers storing the syslogs.

SUMMARY

In general, techniques for deterministic network address translation (NAT) are described. In one example, techniques are described for load-balancing the deterministic NAT functions in a mobile gateway or other device in which subscriber sessions are distributed across a plurality of session management cards. Depending upon the load-balancing technique used within the device, each of the session management cards may host a non-contiguous set of public addresses and a non-contiguous set of private network addresses associated with the subscriber sessions. To facilitate deterministic NAT under such conditions, each of the session management cards locally maps the non-contiguous set of public network addresses to an internal contiguous sequence of identifiers for the public addresses and maps the non-contiguous set of private network addresses to an internal contiguous sequence of identifiers for the private addresses. Each of the session management cards may then perform deterministic NAT on packets based on the contiguous sequence of identifiers for the public addresses and the contiguous sequence of identifiers for the private addresses internal to the session management card.

Further, a source network address and port translation (NAPT) mechanism is described that reduces or even eliminates the need to log NAT translations. As described herein, a mapping between a subscriber's private address to a public address and port range is determined algorithmically. Given a particular mapping rule, as specified by the service provider, a subscriber is repeatedly and deterministically mapped to the same public network address and a specific port range for that network address. Once the public address and port range for a subscriber are computed, the particular ports for each session for that subscriber are allocated dynamically within the computed NAT port range on per session basis.

In addition, given a public network address and specific port, and the particular deterministic NAT rule configuration in use, the techniques algorithmically map that information back to a subscriber's private network address. In other words, the deterministic NAPT techniques described herein are reversible. In this way, if necessary, a subscriber's private address, and therefore identify, can be subsequently determined without needing to maintain voluminous NAT translation logs. Instead, service providers need only store for each deterministic NAT rule a date range in which the rule was used, a range of available private addresses subnets (i.e., the range of the pool of private addresses), and the public address subnets (i.e., the range of the pool of public addresses). The data range may be the date and time of activation and deactivation of the particular mapping rule. In one embodiment, a method comprises hosting a non-contiguous set of public network addresses on each of a plurality of network address translation (NAT) modules, and allocating a non-contiguous set of private network addresses of a private network to each of the NAT modules. The method further comprises, with each of the NAT modules, mapping the non-contiguous set of public network addresses to a contiguous sequence of identifiers for the public addresses and mapping the non-contiguous set of private network addresses to a contiguous sequence of identifiers for the private addresses. The method further includes distributing network packets to the plurality of NAT modules and, with each of the NAT modules, locally performing deterministic NAT on the network packets received by the NAT module based on the contiguous sequence of identifiers for the public addresses and the contiguous sequence of identifiers for the private addresses mapped by the NAT module.

In another embodiment, a network device comprises a plurality of interfaces configured to send and receive network packets for subscribers of a service provider network, a plurality of session management cards that each host a non-contiguous set of public network addresses, and a forwarding component to distribute the network packets to the session management cards. Each of the plurality of session management cards includes a NAT controller that internally maps the non-contiguous set of public network addresses to a contiguous sequence of identifiers for the public addresses and maps a non-contiguous set of private network addresses to a contiguous sequence of identifiers for the private addresses. Each of the NAT controllers locally perform deterministic network address translation on the network packets based on the contiguous sequence of identifiers for the public addresses and the contiguous sequence of identifiers for the private addresses mapped by the NAT controller to output a translated packet.

In another embodiment, a network router comprises a plurality of interfaces configured to send and receive packets for subscribers of a service provider network, each of the subscribers being associated with a private network address. The network router includes a plurality of session management cards to manage subscriber communication sessions associated with the subscribers, and a control unit that executes a routing protocol to maintain routing information specifying routes. The control unit allocates to each of the session management cards a non-contiguous set of public network addresses and a non-contiguous set of the private network addresses. The network router further includes a forwarding component configured by the routing engine to select next hops for the packets in accordance with the routing information, the forwarding component comprising a switch fabric to forward the packets to the between the interfaces and the session management cards. Each of the session management cards locally map the non-contiguous set of public network addresses to an internal contiguous sequence of identifiers for the public addresses and map the non-contiguous set of private network addresses to an internal contiguous sequence of identifiers for the private addresses. Each of the session management cards perform deterministic network address translation (NAT) on the packets based on the contiguous sequence of identifiers for the public addresses and the contiguous sequence of identifiers for the private addresses internal to the session management card.

In another embodiment, a method comprises receiving, with a network device, a packet from a subscriber, wherein the packet includes a private source network address and source port, and selecting a network address translation (NAT) rule for the packet. The method further comprises deterministically computing, with the network device, a public network address and a range of ports assigned to the private network address of the packet using the selected NAT rule, and dynamically selecting an unused port from the range of ports. The method further comprises generating a translated packet from the packet, wherein the translated packet includes the computed public network address and the selected unused port from the range of ports in place of the private source address and source port; and forwarding the translated packet from the network device to a public network.

In another embodiment, a network device comprises a plurality of interfaces that send and receive packets for subscribers of a service provider network, and a control unit that provides a user interface for configuring at least one network address (NAT) rule. The network device further includes a NAT controller that, upon receiving a packet for a new subscriber session, deterministically computes a public network address and a range of ports assigned to a private network address of a subscriber based on the NAT rule. The NAT controller dynamically selects an unused port from the range of ports. A forwarding component outputs a translated packet that includes the computed public network address and the selected unused port in place of the private source address and a source port of the packet.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
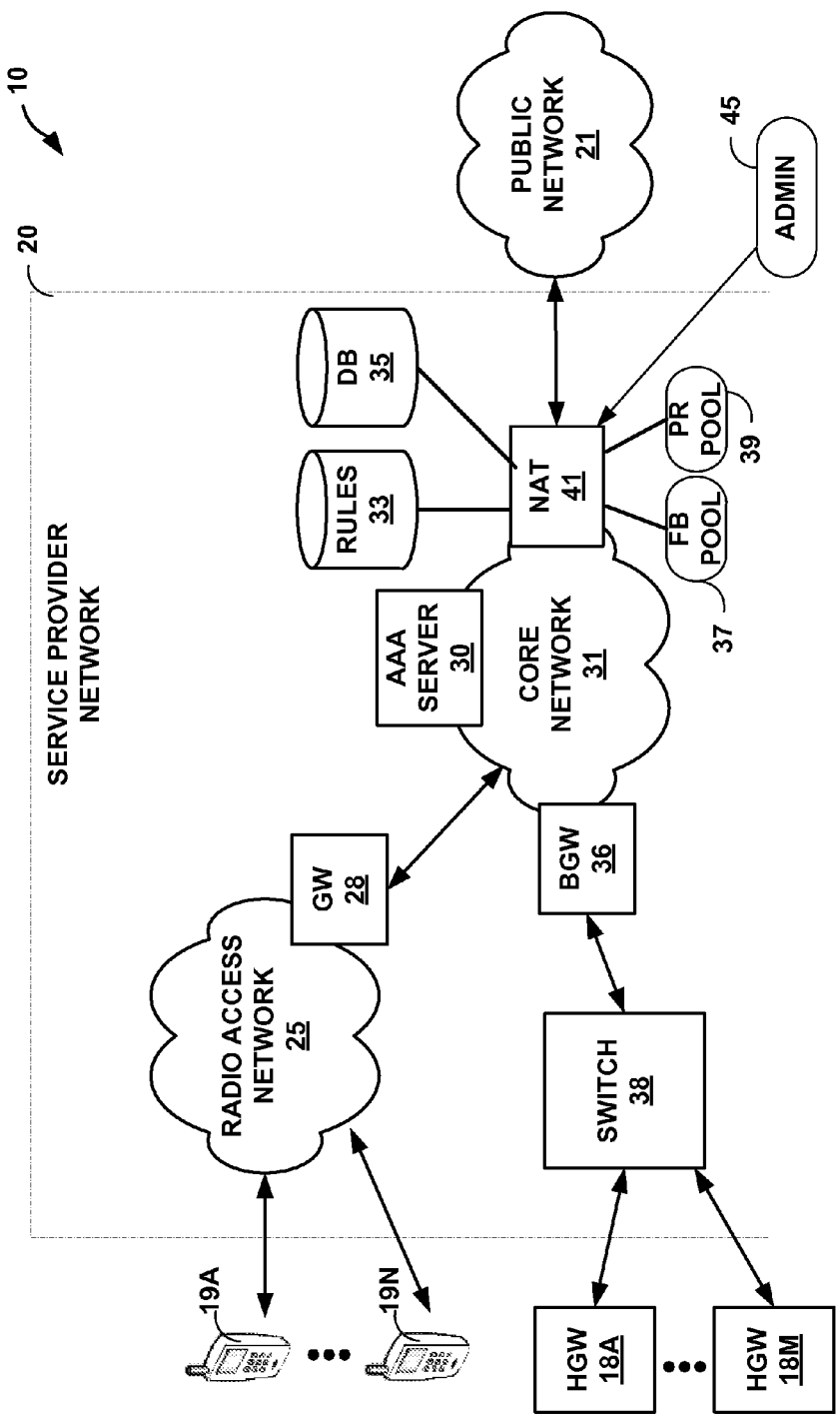
FIG. 1 is a block diagram illustrating an exemplary network system that implements the network address translation techniques described in this disclosure.

FIG. 1 is a block diagram illustrating an exemplary network system 10 that implements the network address translation techniques described in this disclosure. As shown in the example of FIG. 1, network system 10 includes a service provider network 20 and a public network 21. In the example of FIG. 1, service provider network 20 operates as a private network that provides packet-based network access to home gateways ("HGWs") 18A-18M that service endpoint computing devices, such as personal computers, laptop computers or other types of computing device associated with subscribers. In addition, service provider network 20 may provide data services to cellular mobile devices 19A-19N. Mobile devices 19 may comprise, for example, a mobile telephone, a laptop or desktop computer having, e.g., a 3G wireless card, a wireless-capable netbook, a video game device, a pager, a smart phone, or a personal data assistant (PDA). Each of mobile devices 19 may run one or more applications, such as mobile calls, video games, videoconferencing, and email, among others.

In the example of FIG. 1, HGWs 18 connect to a broadband network gateway (BGW) 36 via network switch 38. In one example, HGWs may be DSL modems and network switch 38 may comprise a digital subscriber line access multiplexer (DSLAM) or other switching device. Each of HGWs 18 may utilize a Point-to-Point Protocol (PPP), such as PPP over ATM or PPP over Ethernet (PPPoE), to communicate with network switch 38. For example, using PPP, one of HGWs 18 may request access to core network 31 core network 31 and provide login information, such as a username and password, for authentication by AAA server 30. PPP may be supported on lines such as digital subscriber lines (DSLs) that connect endpoint computing devices 18 with network switch 38. In other embodiments, endpoint computing devices 18 may utilize a non-PPP protocol to communicate with network switch 38. Other embodiments may use other lines besides DSL lines, such as cable, Ethernet over a T1, T3 or other access links.

Network switch 38 may communicate with broadband network gateway 36 over a physical interface supporting various protocols, e.g., ATM interface supporting ATM protocols. Broadband network gateway 36 typically includes Broadband Remote Access Server (BRAS) functionality to aggregate output from switches into a higher-speed uplink to core network 31. In some embodiments, broadband network gateway 36 may comprise a router that maintains routing information between endpoint computing devices 18 and core network 31.

Service provider network 20 may also include radio access network 25 in which one or more base stations communicate via radio signals with mobile devices 19. Radio access network 25 is a transport network that enables base stations to exchange packetized data with core network 31 of the service provider, ultimately for communication with packet data network 21. Radio access network 25 typically comprises communication nodes interconnected by communication links, such as leased land-lines or point-to-point microwave connection. The communication nodes comprise network, aggregation, and switching elements that execute one or more protocols to route packets between base stations and gateway device ("GW") 28. Core network 31 provides session management, mobility management, and transport services between backhaul network 27 and core network 31 to support access, by mobile devices 19, to public network 21 and services of protected resources 14. Core network 31 may comprise, for instance, a general packet radio service (GPRS) core packed-switched network, a GPRS core circuit-switched network, an IP-based mobile multimedia core network, or another type of transport network. Core network 31 typically includes one or more packet processing nodes to support firewall, load balancing, billing, deep-packet inspection (DPI), and other services for mobile traffic traversing the mobile core network.

AAA server 30 is typically an authentication, authorization and accounting (AAA) server to authenticate the credentials a subscriber requesting a network connection. The AAA server 30 may be integrated within a router or gateway of broadband network or on a separate network device and may be, for example, a Remote Authentication Dial-In User Service (RADIUS) server. Upon authenticating a network access request from either an HGW 18 or a mobile device 19, AAA server 30 assigns a private layer three (L3) network address (e.g., an IPv4 network address) for receiving data services within service provider network 20. This may be accomplished in a variety of ways. For example, the private network address may be statically configured on the subscriber device or may be dynamically or statically assigned by AAA server 30 (or gateway 28). Typically, upon authentication of the subscriber, AAA server 30 selects a private IP address from a pool of private network addresses. In some cases, BGW 36 or GW 28 may send a Radius authentication request to AAA server 30 for authentication and assignment of an IP address.

Network address translation (NAT) device 31 provides network address translation for private network addresses routable within service provider network to public network addresses routable within public network 21. As described herein, NAT device 41 applies a source network address and port translation (NAPT) mechanism that may reduce or even eliminate the need for the service provider to generate and maintain logs of NAT translations. As described herein, NAT device 41 applies rules 33 for algorithmically mapping between a subscriber's private network address to a public address and port range (i.e., a block of a plurality of contiguous ports). NAT DEVICE 41 provides an interface by which an administrator 45 defines one or more NAT rules 33. NAT DEVICE 41 records scheduling changes (e.g., activation and deactivation times, interfaces) within database 35 with respect to NAT rules 33. For example, upon activation or deactivation of a particular NAT rule 33, NAT device 41 creates an entry within database 35 to specifically record the data and time at which the NAT rule was put into force or removed. If one example, activation of a different one of deterministic NAT rules 33 causes NAT device 41 to recompute the current NAT bindings for existing flows. Given a particular mapping rule, as specified by administrator 45, NAT device 41 repeatedly and deterministically maps the private network address assigned to each subscriber (e.g., each of GW 18 or mobile devices 19) to a corresponding public network address and specific port range.

For example, upon detecting outbound packet from core network 31 destined for a destination address within public network 21, NAT DEVICE 41 accesses rules 33 to select one of the active rules having criteria that match the characteristics of the outbound traffic. NAT DEVICE 41 then applies the selected rule algorithmically to compute a particular public address and port range based on the private source address of the outbound packet. NAT DEVICE 41 then selects a free port from the port range, i.e., a port that is not currently being used to NAT a different communication session for that same private network address. In this way, once the public address and port range for a subscriber are computed, the particular ports for each session for that subscriber are allocated dynamically within the computed NAT port range on per session basis. In the event that no more ports are available within the port range computed for the particular private IP address, NAT DEVICE 41 may utilize an overload pool, as described in further detail below. NAT device 41 may record within database 35 the association between the private address/port and the public address port for the communication session. NAT DEVICE 41 may remove the entries from database 35 upon the communication session being torn down or upon the entries becoming stale.

Upon computing the public address and dynamically selecting a specific port, NAT device 41 performs network address translation to translate the private source network address and source port within the packet to the computed public network address and the assign port number. During this process NAT device 41 may replace all or a portion of a header (e.g., IP or UDP header) of the packet prior to forwarding the packet to public network 21. Upon receiving an inbound packet from public network 21, NAT device 41 access database 35 to identify a current NAT entry for the communication session and maps the public destination network address and the destination port to the corresponding private network address and port. NAT device 41 may then replace all or a portion of a header (e.g., IP or UDP header) within the packet prior to forwarding the packet to core network 31.

The techniques allow a previously used subscriber's private network address to be algorithmically mapped back to a public network address and specific port, given the particular deterministic NAT rule configuration in use at that time. In other words, the deterministic NAPT techniques described herein are reversible. In this way, if necessary, a subscriber's private address, and therefore identify, can be subsequently determined without needing to maintain voluminous NAT translation logs. Instead, database 35 of service provider network 20 need only store, for each deterministic NAT rule, a date range in which the rule was used, a range of available private addresses subnets (i.e., the range of the pool of private addresses) at that time, and the public address subnets (i.e., the range of the pool of public addresses) at that time. Entries within database 35 may specify the data range as the date and time of activation and deactivation of the particular mapping rule.

With this algorithm, the Public IPv4 address and Port range for a given end user are fixed and can be deterministically computed. Once the port range is determined, the allocation of a given port for a new flow is performed dynamically. A port range of at least 2048 ports per subscriber may, for example, easily be supported.

With this method, database 35 need only store entries for activation/deletion of the source-NAT rule including (Date, Private IP subnet, Public IP subnet), i.e., an activation time period specifying when each the NAT rules has been active. This deterministic port range allocation model is compatible with static port forwarding rules by reserving the <X> initial ports of each range for this function.

In one embodiment, NAT device 41 maintains an overload fallback pool ("FB POOL") 37 of addresses and ports configured along with the primary pool ("PR POOL") 39 of addresses and ports used for deterministic NAT. Initially, an end user will be allocated ports from the primary pool 39 using the deterministic NAT algorithm described herein. If a subscriber runs out of ports from the primary pool 39, then an address and port from fallback pool 37 will be allocated. That is, if the number of concurrent communication sessions for an individual subscriber exceeds the number of ports within the computed port range, then additional addresses and ports are utilized from fallback pool 37. Fallback pool 37 may use the same address range as primary pool 39 or may use a different range of addresses and port range. In one embodiment, instead of allocating individual ports from fallback pool 37, a block of contiguous ports is allocated to a subscriber dynamically and system logs are created upon the creation and deletion of such port blocks, but only for the ports from fallback pool 37. In this way, allocation of ports from fallback pool 37 does not compromise the deterministic nature of the NAT algorithm.

Figure 2:
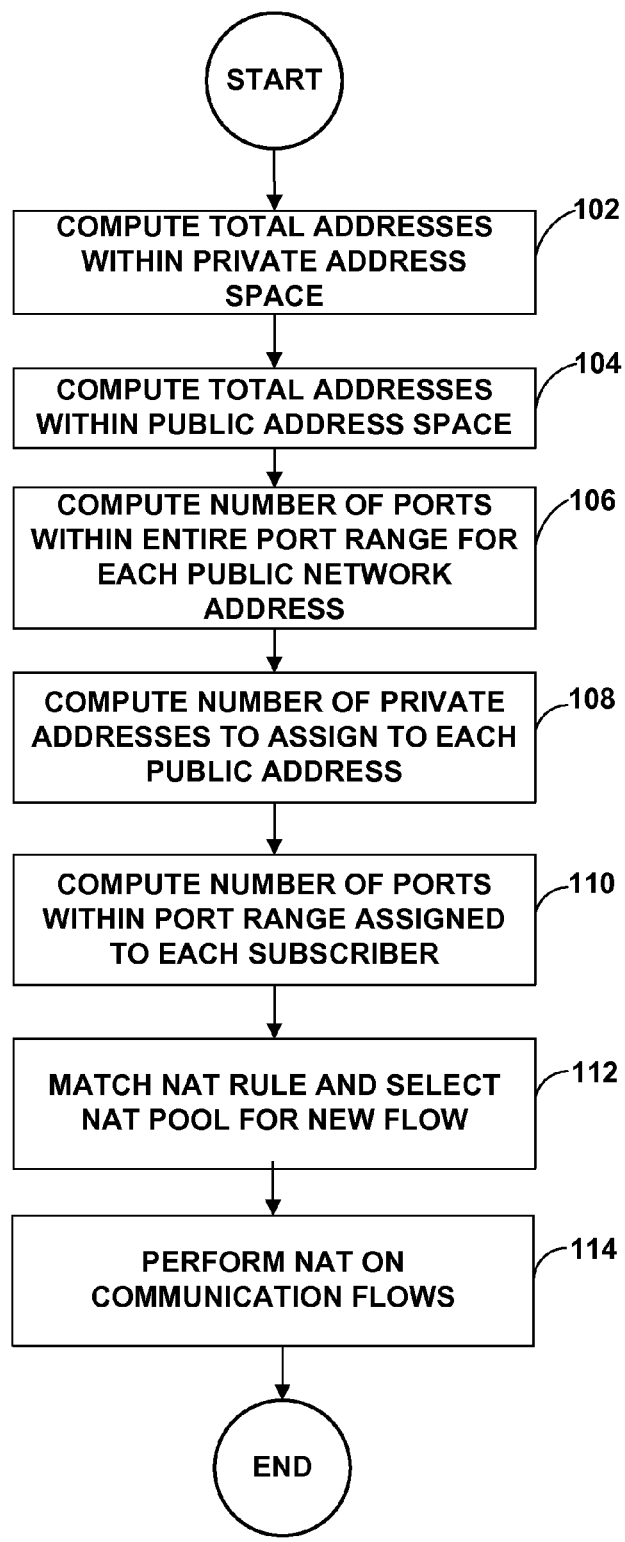
FIG. 2 is a flowchart illustrating an example embodiment of a deterministic network address translation (NAT) technique.

FIG. 2 is a flowchart illustrating an example embodiment of a deterministic network address translation (NAT) technique. The process of FIG. 2 may be invoked for each of NAT rule 33. For example, each NAT rule may include a "from clause" that specifies criteria for matching against a private source address of the packet and may specify multiple address prefixes and/or ranges of private networks to which the rule is to be applied. Similarly, the NATY rule may identify or otherwise correspond to a specific NAT pool and may specify multiple address prefixes and/or multiple address ranges of public addresses. In some embodiments, a user (e.g., administrator 45) is allowed to configure an explicit port range for a given NAT pool. Further, in some cases ports 0 to 1023 by default are reserved and are not allocated for a subscriber unless explicit port range is configured including this reserved port range.

Initially, NAT device 41 computes or otherwise determines for each NAT rule 33 a total number of subscribers (102). This may be computed by counting the numbers of private addresses ("Num-NAT-IPs") configured in all the private source address ranges, prefixes and prefix lists configured in the match condition of the NAT rule. This provides the total private network address space for the NAT rule.

NAT device 41 computes the total number of public IP addresses ("Num-NAT-IPs") available in the NAT rule (104). This may be computed by calculating the total number of NAT addresses in all the prefixes, ranges in the NAT pool (e.g., primary NAT pool 30) configured for the matching NAT rule.

NAT device 41 then computes a number of ports ("Num-Ports-per-NAT-IP") that are available as a contiguous port range for each public network address (106). This may be computed as: Num-Ports-per-NAT-IP=High-port−Low-port+1, where High-port and Low-port are configured in the selected NAT pool for specifying an overall range of contiguous ports for each address. As such, Num-Ports-per-NAT-IP represents the overall port space for each public address with the particular NAT pool.

NAT device 41 then computes a number of private addresses ("Num-Priv-IPs-per-NAT-IP") to assign to each public network address (108). This may be computed as: Num-Priv-IPs-per-NAT-IP=Num-Port-Blocks-per-NAT-IP=roundup(Num-Priv-IPs/Num-Pub-IPs).

NAT device 41 then computes a number of ports ("Num-Ports-per-NAT-IP") in each contiguous port range to be allocated for an individual subscriber for use with a public network address (110). This may be computed as: Port-Block-Size=Num-Ports-per-NAT-IP/Num-Port-Blocks-per-NAT-IP. The information computed in blocks 102-110 may be pre-computed and stored within database 35. In addition, the information may be programmed into forwarding components of NAT device 41.

Upon processing an outbound packet for a new communication session, NAT device 41 matches a NAT rule 33 based on the private source network address or other criteria and selects a NAT pool to use for network address translation (112). NAT device 41 then performs NAT for subscriber communication flows by algorithmically computing a NAT address and port range for the new communication flow using the pre-computed information and dynamically selecting an unused port within the port range (114).

Figure 3:
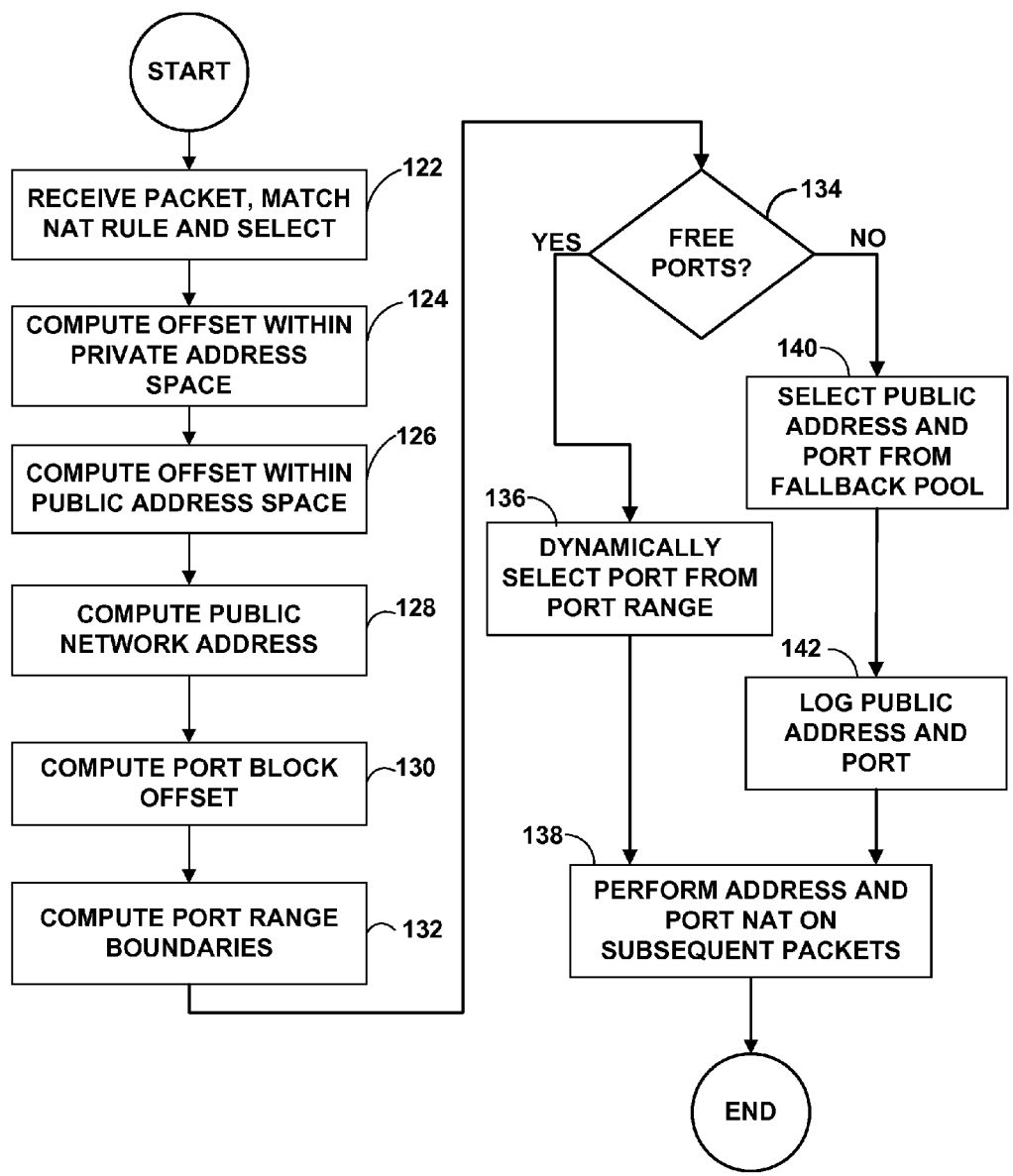
FIG. 3 is a flowchart illustrating in further detail an example process of performing network address translation for a given NAT rule upon detecting a new subscriber session.

FIG. 3 is a flowchart illustrating in further detail an example process of performing network address translation using the information computed in FIG. 2 for a given NAT rule 33. The process of FIG. 3 may be invoked by matching criteria one or more rules (e.g., NAT rules 33) to contents of a packet for a new communication session (122). For example, each NAT rule may include a "from clause" that specifies criteria for matching against a private source address of the packet.

NAT device 41 may first compute a private address offset ("Priv-IP-offset") for the specific private source address within the packet (124). This offset is computed across all the prefixes and ranges of private addresses for the matched NAT rule, assuming all the addresses are adjacent to each other. The private address offset represents the position of the particular subscriber's private network address, as specified as the source address within the outbound packet, within the overall private address space available to the matching NAT rule.

NAT device 41 then computes a public address offset ("NAT-IP-offset") that cross all the prefixes and ranges of public addresses for the matched NAT rule, assuming all the addresses are adjacent to each other (126). The public address offset represents the position to which the particular subscriber's private network address will be mapped within the overall public address space available to the matching NAT rule. This may be computed as follows: NAT-IP-offset=Priv-IP-offset % Num-NAT-IPs, where % represents a modulo operation.

NAT device 41 then computes the public network address ("Allocated-NAT-IP") to be used for the new communication flow from the subscriber (128). This may be computed as follows: Allocated-NAT-IP=Base-Public-IP+NAT-IP-offset, where "Base-Public-IP" represents a starting (lowest) public network address within the pool of available network addresses for the NAT rule.

NAT device 41 similarly computes a port block offset ("Port-block-offset"), which represents the block offset (e.g., a block number out of the total number of port blocks) for the block of ports for this particular subscriber within the overall number of blocks for the public address (130). This may be computed as follows:

Port-block-offset=Priv-IP-offset/Num-NAT-IPs,

Next, NAT device 41 computes the port boundaries for the subscriber based on the port block offset ("Port-block-offset") (132). For example, NAT device 41 may compute the highest port ("High-port-of-port-range") and the lowest port ("Low-port-of-port-range") for this port range. These boundaries of the port range may be computed as follows: Low-port-of-port-range=Low-Port+(Port-Block-Size*Port-block-offset) and High-port-of-port-range=Low-port-of-port-range+Port-Block-Size−1.

At this point, the computed information of Allocated-NAT-IP: [Low-port-of-port-range, High-port-of-port-range] represents the subscriber with the private address Priv-IP of the outbound packet for the newly detected flow. Using this information, NAT device 41 attempts to dynamically assign a port within the calculated port range for the subscriber. Initially, NAT device 41 determines whether any free ports within the port range exist or whether the ports are currently being used for other flows of the subscriber (134). In the event at least one free port exists within the computed port range, NAT device 41 assigns that port for use with the newly detected communication flow (136). At this time NAT device 41 may update forwarding hardware or database 35 with the NAT mapping information for use with the current communication session. NAT device 41 uses the computed public network address and dynamically selected port for performing NAT for packets of the new communication session (138). In this way, no system logs need be generated as the individual subscriber may subsequently be determined from the public network address/port combination in view of the matching NAT rule 33 that was active at the time of the communication flow.

In the event no more free ports exist in the port range computed for the current flow of the subscriber (no of 134), NAT device 41 selects a public IP address and port from fallback pool 37 (140). That is, if the number of concurrent communication sessions for an individual subscriber exceeds the number of ports within the computed port range, then additional public addresses and ports are utilized from fallback pool 37. NAT device 41 may create a system log upon resorting to the user of fallback pool 37 to log the particular public address and port used for the communication flow of the subscriber (142). In this way, system logs may need to be generated only for rare overflow situations, thereby reducing or even potentially eliminating the need to generate and archive system logs.

Figure 4:
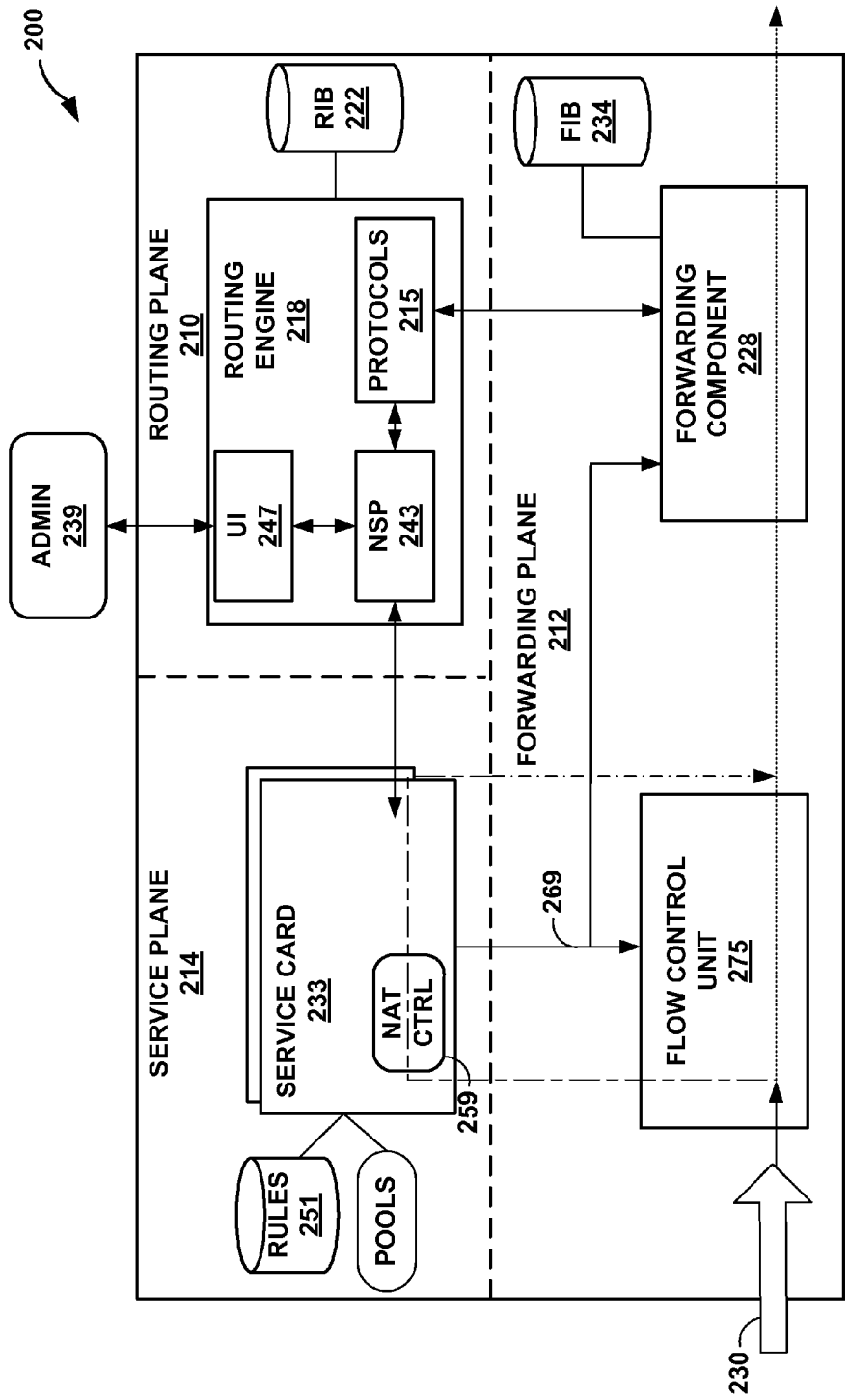
FIG. 4 illustrates an example network device that incorporates the NAT functions described herein.

FIG. 4 illustrates an example network device 200 that incorporates the NAT functions described herein. In this example, network device 200 may be a standalone device or a router or gateway device, such as BGW 36 or GW 28 of FIG. 1. Network device 200 may perform the functions described above with respect to NAT device 41 of FIGS. 1-3. As such example, network device 200 may, for example, be a high-end router or gateway capable of deployment within a service provider network.

In the example of FIG. 4, the components of network device 200 may be logically organized into a routing plane 210, a forwarding plane 212 and a service plane 214 having a plurality of session management cards (service cards 233). Routing plane 210 provides a routing engine 218 that is primarily responsible for maintaining a routing information base (RIB) 222 to reflect the current topology of a network and other network entities to which network device 200 is connected. For example, routing engine 218 provides an operating environment for execution of routing protocols 215 that communicate with peer routers and periodically update RIB 222 to accurately reflect the topology of the network and the other network entities. Example protocols include routing and label switching protocols, such as BGP, ISIS, RSVP-TE and LDP. In some embodiments, network device 200 may be a mobile gateway having a distributed control plane for handling mobile subscribers, such as described within U.S. patent application Ser. No. 13/172,556, entitled "MOBILE GATEWAY HAVING DECENTRALIZED CONTROL PLANE FOR ANCHORING SUBSCRIBER SESSIONS," hereby incorporated herein by reference. In this case, as a mobile gateway, device 200 may have a plurality of session management cards, each handling control functions for a plurality of the subscriber sessions. Each of the session management cards may perform the deterministic NAT techniques described herein for the subscriber sessions assigned to the session management card.

Forwarding plane 212 receives and forwards packets associated with network packet flows 230. Forwarding component 228 maintains forwarding information base (FIB) 234 in accordance with RIB 222, which associates network destinations or MPLS labels with specific next hops and corresponding interface ports of output interface cards of network device 200. Routing engine 218 typically processes RIB 222 to perform route selection and generate FIB 234 based on selected routes. In this way, next hop information may be programmed into forwarding plane 212. Routing engine 218 may generate FIB 234 in the form of a radix tree having leaf nodes that represent destinations within the network. U.S. Pat. No. 7,184,437, the contents of which is incorporated herein by reference in its entirety, provides details on an exemplary embodiment of a router that utilizes a radix tree for route resolution.

When forwarding a packet, forwarding component 228 traverses the radix tree to a leaf node based on information within a header of the packet to ultimately select a next hop and output interface to which to forward the packet. Based on the selection, forwarding component may output the packet directly to the output interface or, in the case of a multi-stage switch fabric of a high-end router, may forward the packet to subsequent stages for switching to the proper output interface. Forwarding plane 212 may be provided by dedicated forwarding integrated circuits normally associated with high-end routing and forwarding components of a network router. U.S. Patent Application 2008/0044181, entitled MULTI-CHASSIS ROUTER WITH MULTIPLEXED OPTICAL INTERCONNECTS, describes a multi-chassis router in which a multi-stage switch fabric, such as a 3-stage Clos switch fabric, is used as a high-end forwarding plane to relay packets between multiple routing nodes of the multi-chassis router. The entire contents of U.S. Patent Application 2008/0044181 are incorporated herein by reference.

In this way, as shown in the example embodiment of FIG. 4, network device 200 integrates service plane 214 and routing plane 210 to utilize shared forwarding plane 212. Forwarding plane 212 may be a rich and dynamic shared forwarding plane, optionally distributed over a multi-chassis router. Moreover, forwarding plane 212 may be provided by dedicated forwarding integrated circuits normally associated with high-end routing components of a network router. Consequently, routing plane 210 and forwarding plane 212 may operate as a high-end router or gateway, and service plane 214 has been tightly integrated within network device 200 (e.g., by way of service cards 233) so as to use forwarding plane 212 of the routing components in a shared, cooperative manner. Further details of one example embodiment of network device 200 can be found in U.S. Provisional Patent Application 61/054,692, filed May 20, 2008, entitled "STREAMLINED PACKET FORWARDING USING DYNAMIC FILTERS FOR ROUTING AND SECURITY IN A SHARED FORWARDING PLANE," the entire contents of which is incorporated herein by reference.

Network services process (NSP) 243 of routing engine 46 communicates with and programs service cards 233 of service plane 214. For example, routing engine 218 may present a user interface (UI) 247 to receive configuration data from administrator 239 defining NAT rules 251. In response, NSP 243 programs services cards 233 with corresponding configuration data, causing the service cards of service plane 214 to perform the functions described herein when processing packets redirected from forwarding plane 212. One or more of service cards 233 may, for example, execute NAT controller (NAT CTRL) 259 that operates on packets for new subscriber communication flows to dynamically determine a public network address and port range as described herein, such as by the process described in reference to FIG. 2.

For example, forwarding plane 212 may include a flow control unit 275 to selectively direct packets of newly detected communication sessions to service plane 214 for processing. For example, flow control unit 275 receives incoming packet flows 230 (e.g., outbound subscriber traffic) and determines whether to send the packets through the service plane 214 for processing within one or more of service cards 233, or whether to bypass the service plane 214. Service cards 233 receive packets from flow control unit 275, computes NAT information as described herein to select a public network address and port for the communication flow, configures forwarding component 228 in accordance with the computed information and relays the packet or any response packets to forwarding plane 212 for forwarding by forwarding component 228 in accordance with FIB 234.

Service cards 233 within service plane 214 may be installed along a backplane or other interconnect of network device 200 to perform a variety of other services on the packets received from forwarding plane 212, such as filtering, logging, Intrusion Detection and Prevention (IDP) analysis, virus scanning, deep packet inspection. In some cases, service card 233 may issue commands 269 to dynamically configure a flow table within flow control unit 275 of forwarding plane 212. For example, when flow control unit 275 receives a packet and determines that the packet belongs to a new packet flow that does not match any of its filters, flow control unit 275 may send the packet to service cards 233 for processing and initial computation and assignment of a public address and port, as described for exemplary purposes with respect to FIGS. 1 and 2.

Upon receiving and processing the packet or packets of a packet flow, service cards 233 may issue a command 269 to install a dynamic filter within the flow table, such as an exact match filter that indicates particular actions to be performed when a packet is received that matches the filter. For example, upon processing an initial packet of a flow to compute the public network address and port, NAT controller 259 of service cards 233 may output commands 269 to program this information into forwarding component 228. In addition, NAT controller 259 may output commands 269 to install a filter within flow control unit 275 to specify that subsequent packets of this packet flow session may be processed on a straight path that bypasses service plane 214. When flow control unit 275 receives a subsequent packet of the same packet flow, flow control unit 275 checks the flow table, determines that the packet matches the new dynamic filter, and directs the packet on the appropriate path according to the dynamic filter. As such, subsequent inbound and outbound packets of the packet flow may be processed directly by forwarding component 228 for network address translation and network forwarding.

In one example embodiment, the user interface 247 provides a command line interface in which a syntax supports a new NAT translation-type keyword of "deterministic-napt44." When this translation type is configured in a NAT rule 251 by administrator 239, the deterministic NAT feature described herein is applied to traffic matching that rule.

In addition, a new "fallback-interface" keyword is introduced under service configuration. A fallback interface identifies one of removable service cards 233 to be used for communication sessions that cannot be handled by the deterministic NAT feature, e.g., traffic for sessions of subscribers who exceed their pre-computed port range.

A sample text-based configuration invoking the deterministic NAT feature is shown below:

```
root# show services
service-set ss-deterministic-nat {
nat-rules det-nat-rule1;
interface-service {
   service-interface si-5/0/0;
   fallback-interface sp-4/0/0;
}
}
nat {
pool det-nat-pool {//Primary pool
   address 20.20.20.0/24;
   port automatic;
}
pool fallback-pool {//Fall backpool
   address 30.30.30.0/24;
   port automatic;
}
rule det-nat-rule1{
   match-direction input;
   term t1 {
     from {
        source-address {
          10.60.1.0/16;
        }
     }
     then {
        translated {
          source-pool det-nat-pool;
          overload-pool fallback-pool;
          translation-type {
          source deterministic-napt44;
          }
        }
     }
   }
}
}
```

In addition, a "show" command may utilized to show inline services flows to which the deterministic NAT is being applied. The CLI show commands may be enhanced to show additional information specific to the deterministic NAT feature. For example, a new show command called "show services inline flows" shows flow information for inline flows, as follows:

user@MX240# run show services inline flows
    Interface: si-1/0/0, Service set: idet-nat-sset
    TCP 63.111.11.175:443→8.20.211.25:2882
    NAT dest 8.20.211.25:2882→192.168.0.100:62983
    Packets: 1000 Bytes: 15236
    TCP 192.168.0.100:62983→63.111.11.175:443
    NAT source 192.168.0.100:62983→8.20.211.25:2882
    Packets: 10 Bytes: 1536

A "show services inline nat pool" command may be used to show port usage on per pool basis and any error counters (e.g., out of ports).

user@MX240# run show services inline nat pool
    Interface: si-1/0/0, Service set: idet-nat-sset
    NAT pool: p1, Translation type: BASIC NAT44
    Address range: 20.0.0.0-20.0.0.5
    Port range: 512-65535, Ports in use: 0, Out of port errors: 0
    Max ports used: 0, NATed packets: 8, deNATed packets: 8

A "show services inline nat statistics" command may be used to show counters and errors specific to deterministic NAT. These counters are displayed on per si-interface level.

user@MX240# run show services inline nat statistics
    Service PIC Name :si-1/0/0
    Slow path packets received :10
    Slow path packets dropped :0
    Packets received :0
    Packets sent :0
    Flows created :0
    Flows deleted :0
    Active subscribers :0
    Flow insertion errors :0
    Flow deletion errors :0
    Out of port errors :0
    Subscribers with no free ports :0

Another command may be used to display the private network address to public address and port block information for all the private addresses of all the deterministic NAT rules 251.

Another command may be used to display, given a private network address, the public address and port block currently assigned to that subscriber. If the private address appears in multiple deterministic NAT rules 251, all possible mappings may be displayed.

Another command may be used to display, given a public address and specific port, the corresponding private network address (i.e., the subscriber's network address).

In one embodiment, forwarding plane 212 maintains a subscriber table (not shown) to maintain per subscriber information upon detecting an initial flow from a new subscriber. Forwarding plane 212 creates a new subscriber entry when a subscriber is seen for the very first time. When all the subscriber sessions and NAT ports are released by NAT controller 259, the corresponding entry in the subscriber table is freed. In some embodiments, the subscriber table is implemented as a hash table having of a key of <private IP of subscriber, a NAT rule id>. The NAT rule id may be included to allow configurations where the same subscriber can be in the matching condition of multiple rules but pointing to different NAT pools. For example, one type of traffic from a subscriber can be configured to use one pool and a different type of traffic can be configured to use another NAT pool. In one embodiment, each entry of the subscriber hash table may contain the following information:

1. Number of ports allocated for this subscriber;
2. Low port number of the subscriber's NAT port range;
3. A pointer to a port bitmap; and
4. A flag indicating whether to direct subscriber's new sessions to the fallback service card. If the flow lookup fails on a packet, before NAT port allocation is attempted, forwarding plane 212 examines this bit and, if set, the packet is directed to the service card 233 that is designated as handling fallback/overflow condition.

In some embodiments, forwarding plane 212 (e.g., a processor or other forwarding component 228) computes the private address to public address mapping and user's public port range according to the deterministic NAT algorithm. In the alternative, this can also be pre-computed by NAT controller 259 as described above or NSP 243, which pass on this mapping to forwarding plane 212.

When flow lookup fails within the flow table, NAT controller 259 matches the packet against rules 251. At this point, NAT controller 259 needs to allocate NAT IP and port range for that session. NAT controller 259 performs a lookup on the subscriber hash table to see if a subscriber entry already exists in that table. If the subscriber entry doesn't exist, NAT controller 259 creates a new entry in the table. If the table is full, the session may be dropped and a counter is incremented. Once the subscriber's entry is picked, a search for a free bit from a port bitmap that is assigned to that subscriber is performed, where each bit of the bitmap corresponds to a port within the port range and indicates whether that port is currently in use. The NAT port corresponding to the first free bit is allocated. Once allocated, the corresponding port bit is set. At this point, both NAT IP and port are allocated for that subscriber and a flow entry is created in the flow table. In case there are no more NAT ports are available, the packet may be dropped and a counter is incremented. Similarly, if the flow table does not have a free entry then the packet may be dropped and corresponding counter is incremented. To process the reverse traffic, a reverse flow is also setup to map the public address and port to the private address and port. Both forward and reverse flows are linked together within the flow table. Once both the flows are setup, forwarding component 228 applies NAT to the packet and forwards the packet out a selected interface. Although described with respect to NAT controller 259, these functions may be performed entirely within flow control unit 75 of forwarding plane 212.

Once the first packet is processed, NAT bindings for forward and reverse traffic will be setup properly, and hence flow lookups for packets in that session will succeed. If the flow lookup succeeds, NAT or de-NAT action is performed using the existing NAT bindings and packet is forwarded.

For Deterministic NAT, no IP reassembly is necessarily required for fragments in the outbound direction (i.e., from private network to public side). This is because the first fragment contains port information and the flow lookup will succeed, if the flow exists. The NAT information in the flow can be used to NAPT that packet. If no flow is found, then a NAT address and port are allocated first, the flow is created and the packet is NAT-ed. For the rest of the fragments, the port information is not available. However, since private address to public address mapping is algorithmic, the public address can be computed on the fly and the packet can be NAT-ed as only the source address needs to be translated.

In the reverse direction, complete packet reassembly may be performed to reverse NAT the packet because a given public address may be shared between many subscribers.

Fragments may be reassembled inline within forwarding plane 212 before the packet is deNATed.

Each flow record within the flow table may take the form of a 64-byte record. The hash key used Deterministic NAT may be a standard 5-tuple key (source address, source port, destination address, destination port, protocol) with a new application identifier for NAT. Both the forward and reverse flow records may be indexed by 5-tuple hash key.

The forward flow record may indexed by:
Hash-key=[Private src IP, Private src port, Dst address, Dst port, protocol, iif, App-type]. The flow record may contain the following fields:
1. NAT address
2. NAT port
3. Packet and byte counters
4. flow creation timestamp
5. last packet timestamp
6. Idle/inactivity timeout
7. Pointer/index to the reverse flow record
8. Translation type (forward or reverse)

For traffic in the reverse direction, the reverse flow record may be indexed by:
Hash-key=[Src IP, Src port, Dst address (NAT address), Dst port (NAT port), protocol, App-type]. The flow record may contain the following fields:
1. Private dst address
2. Private dst port
3. Packet and byte counters
4. last packet timestamp
5. Pointer/index to the flow record (might need for flow clean up purposes)
6. Translation type (forward or reverse)

For flow aging purposes, it is not required to have last packet timestamp in both forward and reverse flow records separately. Instead, one last packet timestamp for both forward and reverse flows may be sufficient. Each time a packet is received on either a forward flow or reverse flow, the common timestamp can be updated and that can be used to age both the flows at the same time.

As described, an overload pool may be used when a subscriber has used up all the public ports from his/her port range of the primary pool. This overload pool can contain completely different NAT addresses or same NAT addresses as the primary pool but with different/reserved port range.

The following provides example implementations of the Deterministic NAT algorithms described herein.

Consider the following configuration:
```
nat {
  pool det-nat-pool {
    address-range low 20.20.20.5 high 20.20.20.8;
    port automatic; // port range is from 1024 to 65535
  }
  rule det-nat-rule1 {
    match-direction input;
    term t1 {
      from {
        source-address-range low 10.10.10.10 high 10.10.10.20;
      }
      then {
        translated {
          source-pool det-nat-pool;
          translation-type {
            source deterministic-napt44;
          }
        }
      }
    }
  }
}
```

In this example, we have the following:
No. of private addresses=11
No. of NAT IPs=4
No. of ports available per address=65535−1024+1=64512
No. of private addresses per NAT IP=No. of port blocks per NAT IP=roundup(11/4)=3
Size of each port block=64512/3=21504
No. of port blocks=No. of NAT IPs*No. of blocks per NAT IP=4 *3=12.
   As we have only 11 subscribers, the $12^{th}$ block will be unused.

Let us look at the NAT address and port range assignment with an example. When a packet from 10.10.10.16 is received:
Private address offset=10.10.10.16−10.10.10.10=6
NAT IP offset=Private address offset % No. of NAT IPs=6% 4=2
Port block offset=Private address offset/No. of NAT IPs=1
So, the NAT IP=20.20.20.5+2=20.20.20.7
$1^{st}$ port of port range=1024+(21504 *1)=22528
Last port of port range=22528+(21504−1)=44031

Consider the following configuration, which is similar to previous example, but an explicit port range is configured in the NAT pool by the user.
```
nat {
  pool det-nat-pool {
    address-range low 20.20.20.5 high 20.20.20.8;
    port range low 10000 high 20000;
  }
  rule det-nat-rule1 {
    match-direction input;
    term t1 {
      from {
        source-address-range low 10.10.10.10 high 10.10.10.20;
      }
      then {
        translated {
          source-pool det-nat-pool;
          translation-type {
            source deterministic-napt44;
          }
        }
      }
    }
  }
}
```

In this example,
No. of private addresses=11
No. of NAT IPs=4
No. of ports available per address=20000−10000+1=10001
No. of private addresses per NAT IP=No. of port blocks per NAT IP=roundup(11/4)=3
Size of each port block=10001/3=3333
No. of port blocks=No. of NAT IPs*No. of blocks per NAT IP=4*3=12. As we have only 11 subscribers, the $12^{th}$ block will be unused.

In addition, since 3333*3=9999, there will be a wastage of 10001−9999=2 ports per NAT IP. Unlike the previous example, here there are some ports that are unused for each IP address (over and above the $12^{th}$ block).

Consider the NAT address and port range assignment. When a packet from 10.10.10.16 is received, for example:

Private address offset=10.10.10.16−10.10.10.10=6
NAT IP offset=Private address offset % No. of NAT IPs=6% 4=2
Port block offset=Private address offset/No. of NAT IPs=1
So, the NAT IP=20.20.20.5+2=20.20.20.7
$1^{st}$ port of port range=10000+(3333*1)=13333
Last port of port range=13333+(3333−1)=16665

Consider the following configuration, where there are more NAT IP addresses than subscribers but each NAT IP address only has limited number of ports. This example is shown to highlight a corner case, but may or may not be practical.

```
nat {
  pool det-nat-pool {
    address-range low 20.20.20.5 high 20.20.20.10;
    port range low 5000 high 5009;
  }
  rule det-nat-rule1 {
  match-direction input;
    term t1 {
      from {
        source-address-range    low    10.10.10.10    high
          10.10.10.14;
      }
      then {
        translated {
          source-pool det-nat-pool;
          translation-type {
            source deterministic-napt44;
          }
        }
      }
    }
  }
}
```

In this example,
No. of private addresses=5
No. of NAT IPs=6
No. of ports available per address=5009−5000+1=10
No. of private addresses per NAT IP=No. of port blocks per NAT IP=roundup(5/6) =1
Size of each port block=10/1=10

In this example, there is 1:1 relation between NAT IP and private IPs, unlike previous examples where there is N:1 relationship. Also, each subscriber gets all ports of each NAT IP. No. of port blocks=No. of NAT IPs*No. of blocks per NAT IP=6 *1=6. As there are only 5 subscribers, the $6^{th}$ block (and hence the $6^{th}$ NAT IP) will be unused. Out of 60 NAT ports, only 50 ports are usable. Consider the NAT address and port range assignment with an example. When a packet from 10.10.10.13 is received:

Private address offset=10.10.10.13−10.10.10.10=3
NAT IP offset=Private address offset % No. of NAT IPs=3% 6=3
Port block offset=Private address offset/No. of NAT IPs=3/ 6=0
So, the NAT IP=20.20.20.5+3=20.20.20.8
$1^{st}$ port of port range=5000+(10 *0)=5000
Last port of port range=5000+(10−1)=5009

Next, consider the following configuration:
```
nat {
  pool det-nat-pool {
    address 20.20.20.0/24;
    address-range low 30.30.30.1 high 30.30.30.10;
    port automatic;
  }
  rule det-nat-rule1 {
  match-direction input;
    term t1 {
      from {
        source-address {
          10.60.1.0/20;
        }
        source-address-range    low    10.70.1.1    high
          10.70.1.10;
      }
      then {
        translated {
          source-pool det-nat-pool;
          translation-type {
            source deterministic-napt44;
          }
        }
      }
    }
  }
}
```

In this example, an address range and address prefix are configured in the from clause and an address range and prefix are configured in the nat pool. In general, any number of prefixes and ranges can be configured (as long as the ddl constraints don't kick in). Given this, the following is computed:

No. of private addresses=(1<<(32−20))+(10.70.1.10−10.70.1.1+1)=4096+10=4106
No. of NAT IPs=(1<<(32−24))+(30.30.30.10−30.30.30.1+1)=256+10=266
No. of private addresses per NAT IP=No. of port blocks per NAT IP=roundup(4106/266)=16
Total number of port blocks=16*266=4256.
Size of port block=64512/16=4032.

As such, each subscriber is allocated 4032 ports. Note that per address 4032*16=64512, so in this example all 64512 ports are used. However, there are only 4106 subscribers where as 4256 port blocks are available. So, 4256−4106=150 port blocks (which is 604800 ports) will remain unused.

Once the port blocks have been computed, the port blocks are assigned to each subscriber. As discussed, in one example, the offset of the subscriber's private IP address from the $1^{st}$ address of the private address space is computed. Even though the private address space can be non-contiguous (like in the above example), the addresses may be treated as contiguous for purposes of computing the offset. For example, when a packet is received from 10.70.1.5, the offset is computed as (1<<(32−20))+(10.70.1.5−10.70.1.1+1)−1=4096+5−1=4100. In this case:

Private address offset=4100
NAT IP offset=Private address offset % No. of NAT IPs=4100% 266=110
Port block offset=Private address offset/No. of NAT IPs=15
The $110^{th}$ NAT address is selected (note that offset starts from 0 in this example) and the $15^{th}$ block (offset starts from 0) of that NAT address. As such, in this example, the NAT address would be 20.20.20.110, the low end of port range would be 1024*+4032 *15=60480 and the high end of the port range would be 60480+4032 −1=64511. This subscriber's communication session will be assigned NAT address of 30.30.30.2 and a port from range [60480, 64511].

Figure 5:
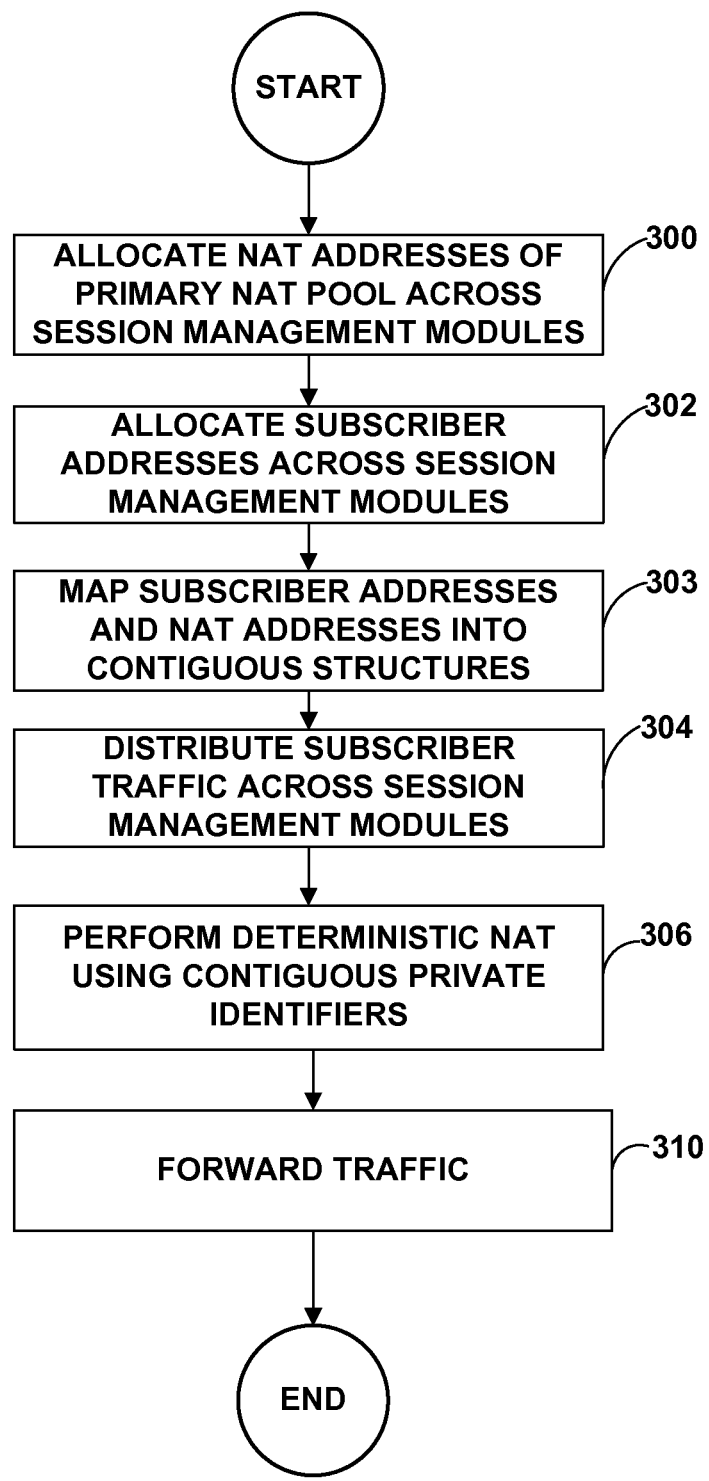
FIG. 5 is a flowchart illustrating example techniques for load-balancing deterministic NAT functions in a router or other device in which subscriber sessions are distributed across a plurality of session management cards.

FIG. 5 is a flowchart illustrating example techniques for load-balancing the deterministic NAT functions in a router or gateway device in which subscriber sessions are distributed across a plurality of session management modules. For purposes of explanation, FIG. 5 is described with respect to network device 200 of FIG. 4 in which each of service cards 233 execute a NAT controller (NAT CTRL) 259 that operates on packets for subscriber communication flows to dynamically and deterministically perform network address translation.

As shown in FIG. 5, initially the public addresses of the primary pool of addresses are allocated across the session management modules, i.e., service cards 233 in this example (300). In one embodiment, routine engine 218 determines the public addresses to be hosted by each service cards 233. In some embodiments, routing engine 218 allocates a non-contiguous set of the public network addresses of the public network to each of service cards 233 and configures each of service cards to host the determined set of public network addresses. In other examples, routing engine 218 configures each service card 233 with an identifier and each service card programmatically computes its own non-contiguous set of the public network address. Routing engine 218 may install routes within forwarding component 228 shared by service cards 233, where the routes specify corresponding session cards as next hops for packets destined for the public network addresses.

Similarly, the private subscriber addresses of the private network are allocated across service cards 233 (302). In some examples, allocation schemes that allocate the public network addresses and the private subscriber addresses may allocate the addresses to service cards 233 in a non-contiguous manner, which may allow for more efficient session handling and subscriber traffic load balancing. In some embodiments, routing engine 218 allocates a non-contiguous of the private network addresses of the private network to each of service cards 233 and communicates the set of private network addresses to each respective service card. In other examples, routing engine 218 configures each service card 233 with an identifier and each service card programmatically computes its own non-contiguous set of the private network address.

For example, a mapping may be utilized where the service card 233 to which a specific public address ("NAT-IP") is allocated can be directly computed as follows: SPIC=NAT-IP % Num-PICS, where SPIC represents an identifier for the service card and ranges from zero to the number of service cards ("Num-PICS")−1. Similarly, a mapping may be utilized where the service card 233 to which a specific subscriber private address ("Priv-IP") is allocated can be directly computed as follows: SPIC=Priv-IP % Num-PICS. This technique may provide efficient load balancing yet lead to non-contiguous address spaces to be separately handled by NAT CTRLs 259. This may render it difficult for each of NAT CTRLs 259 to separately apply deterministic NAT operations.

As an example, consider a configuration in which there are six (6) public network addresses (ranging in this example from 1 to 6), sixty (60) private subscriber IP addresses (ranging in this example from 1 to 60) and three (3) service cards 233 (with identifiers 0 to 2). In this case, public network addresses 3, 6 will be hosted on a first one of service cards 233 having an identifier of zero (PIC 0) and will be serviced by private subscriber IP addresses 3, 6, 9, 12, 15, 18 . . . 60. Public network addresses 1, 4 will be hosted by a second one of service cards 233 having an identifier of one (PIC 1), and will be serviced by private subscriber IP addresses 1, 4, 7, 10, 13, 16 . . . 58. Public network addresses 2, 5 hosted on a third one of the service cards 233 having an identifier of two (PIC 2) and will be serviced by private subscriber IP addresses 2, 5, 8, 11, 14, 17 . . . 59.

Next, the allocation of public network addresses and private subscriber network addresses on each service card 233 are mapped into contiguous sequences of private identifiers within each service card for purposes of deterministic NAT on the respective service card (303). That is, each of service cards 233 internally maps the non-contiguous set of public network addresses assigned to the service card to a first contiguous sequence of identifiers. In addition, each of the service cards internally map the non-contiguous set of private network addresses assigned to the card to a second contiguous sequence of identifiers. For example, NAT controller 259 executing on each service card 232 may be configured to compute sorted lists of the public addresses and the private addresses that are allocated to the service card. NAT controller 259 may then associate a contiguous set of identifiers with each of the sorted lists. In simplest form, the local identifiers assigned by NAT controller 259 within each service card 233 may be indices into the sorted lists. NAT controller 259 need not store sorted lists of the public network addresses and the private subscriber addresses allocated to the respective service card 233 but instead may compute the corresponding index directly from the address.

In operation, subscriber communications may be load-balanced across service cards 233 for various operations and services, such as network address translation (304). For example, forwarding component 212 may receive outbound packets from subscribers and destined for the public network. Forwarding component 212 may load balance the packets across service cards 233 by, for example, performing a modulo operation on the private source network address within each packet using the number of the service cards as an operand to the module operation. Forwarding component 212 may select one of the plurality of NAT modules based on a result of the modulo operation and forward the packet to the selected one of the plurality of NAT modules. As another example, forwarding component 212 may apply a hash function to the private network address.

Similarly, forwarding component 212 may receive inbound packets from the public network and destined for subscribers of the private network. In this case, forwarding component 212 may perform a lookup operation for each packet to identify a route for the packet based on a public network address within the inbound packet. In this case, the selected route identifies one of service cards 233 as a next hop. As such, forwarding component 212 selecting one of the service cards 233 based the identified route and forwards the inbound network packet to the selected service card for network address translation.

Upon receiving packets from forwarding component 212, NAT CTRL 259 of each service card 233 operates on the packets to dynamically and deterministically perform network address translation (306). For example, upon receiving outbound packets for new communication flows, NAT CTRLs 259 may assign public network addresses and port ranges as described herein. At this time, NAT CTRL 259 for each service card 233 uses the contiguous sets of identifiers associated with the potentially non-contiguous public addresses and private addresses to perform deterministic NAT (306). In some embodiments, for example, NAT CTRL 259 applies the deterministic NAT techniques described herein, such as by the process described in reference to FIG. 2, to the internal identifiers. In other embodiments, NAT CTRL 259 may apply any other algorithm for deterministic NAT to the internal identifiers to deterministically compute a public address for a given private subscriber address. That is, the techniques described herein allow load balancing subscriber sessions across multiple components for algorithmically deterministic NAT in a manner that is independent of the particular type of deterministic NAT algorithms applied. The techniques for mapping potentially non-contiguous addresses to contiguous identifiers allow each of service cards 233 to apply any type of deterministic NAT algorithms for computing a public address from a private subscriber address.

For example, for outbound packets received from subscribers, NAT CTRLs 259 map, for each of the packets, the private subscriber address of the packet to one of the identifiers (e.g., indices) internal to the service card mapped to the subscriber addresses. NAT CTRL 259 then applies a deterministic NAT algorithm to deterministically select, with the NAT module, one of its internal sequential identifiers (e.g., indices) for the public network addresses and a range of ports based on the selected internal identifier for the subscriber address. NAT CTRL 259 then maps the computed one of the sequential identifiers for the public network addresses to one of the non-contiguous public network addresses hosted by service card 233 and dynamically selects an unused port. Finally, NAT CTRL 259 generates a translated packet from the packet, where the translated packet includes the determined public network address and the selected unused port from the range of ports in place of the private source address and source port. Alternatively, NAT CTRLs 259 may configure shared forwarding component 212 such that subsequent inbound and outbound packets of the packet flow may be processed directly by forwarding component 228 for deterministic network address translation and network forwarding using the mapping to sequential identifiers. Similarly when the inbound packet is received, each of NAT CTRLs 259 use the corresponding local identifier for the public addresses in the deterministic NAT algorithm to compute one of the contiguous identifiers for the subscriber addresses. The corresponding subscriber address is used for network address translation to generate a translated inbound packet destined for the particular subscriber.

After applying deterministic NAT, network device 200 forwards the packets (310).

Figure 6:
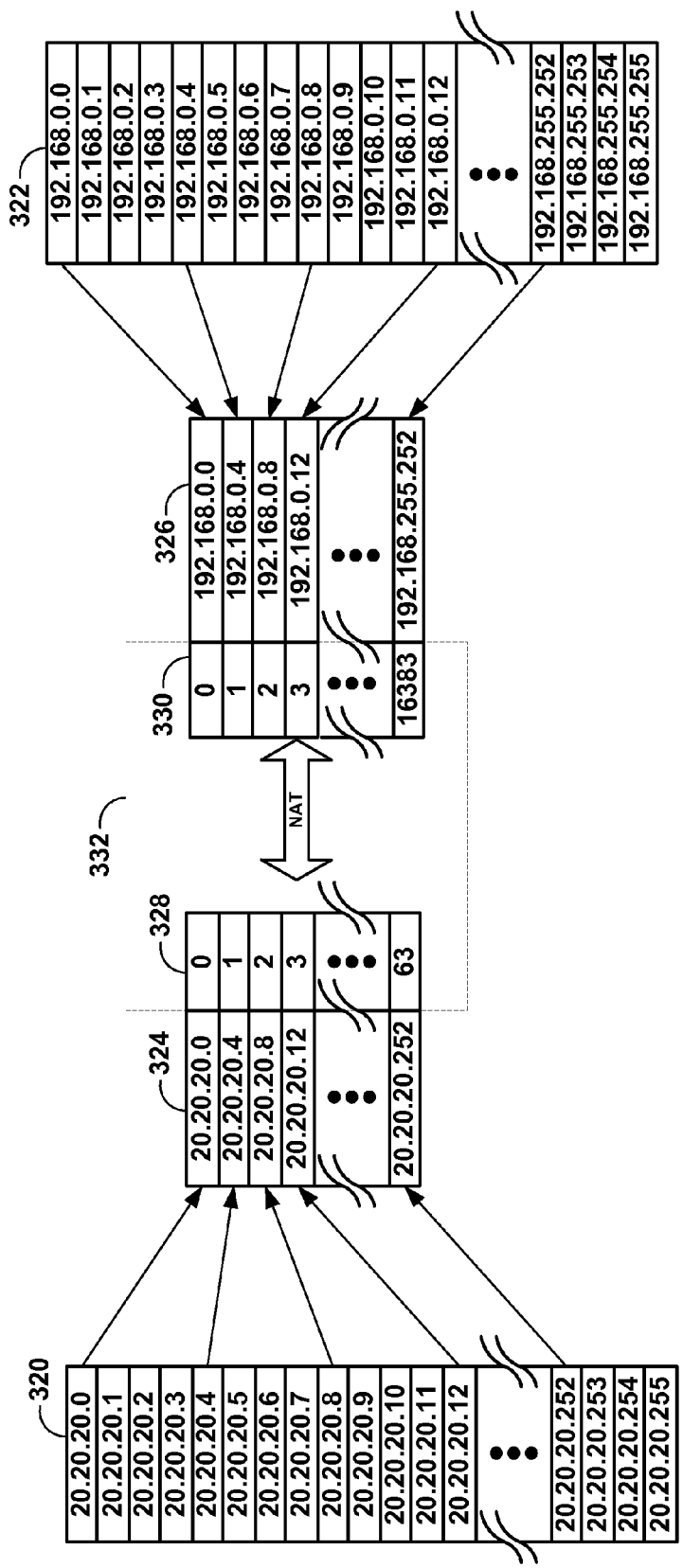
FIG. 6 is a diagram illustrating the application of techniques described herein to facilitate deterministic NAT functions for load-balanced subscriber sessions.

FIG. 6 is a diagram illustrating the application of techniques described herein that facilitate deterministic NAT functions in a mobile gateway or other device in which subscriber sessions are distributed across a plurality of session management modules. In this example of FIG. 6, a NAT pool of 20.20.20.x/24 is defined to provide 256 public network addresses 320 for use by service cards 233 of network device 200. In addition, private address range of 192.168.x.x/16 is used by network device 200 to provide 64K private addresses 322 to subscribers. In this example, NAT functions are distributed across four service cards 233, each of the four service cards being allocated 16K non-contiguous subscriber addresses. In this case, a set of non-contiguous public network addresses 324 will be hosted on a first one of service cards 233 having an identifier of zero (i.e., "PIC 0") and will be serviced by a set of non-contiguous private subscriber IP addresses 326.

The service card 233 (PIC 0 in this example) maps the non-contiguous public addresses 234 hosted by the card into a contiguous sequence of identifiers 328 (0 to 63) and maps the non-contiguous sequence of private addresses 326 serviced by the card into a contiguous sequence of identifiers 330 (0 to 16380). Non-contiguous public addresses 324 and private addresses 326 may take the form of sorted lists maintained by each service card 233 and identifiers 328, 330 may represent corresponding, sequential indexes into the data structure. In other cases, sequential indexes 328 and 330 can be mathematically computed dynamically as needed. In either case, contiguous sequences 328, 330 of identifiers serve to provide a set of virtual addresses 332 to which a local, deterministic NAT algorithm may be applied within the individual service card or other component to which a set of subscriber sessions and public addresses is load balanced. Instead of utilizing public addresses 320 and private addresses 322 directly in the algorithm, NAT CTRL 259 substitutes the virtual addresses 332 in place of the non-contiguous addresses 320, 322.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
hosting a non-contiguous set of public network addresses on each of a plurality of network address translation (NAT) modules of a network device;
allocating a non-contiguous set of private network addresses of a private network to each of the NAT modules;
with each of the NAT modules, internally mapping the non-contiguous set of public network addresses to a contiguous sequence of identifiers for the public addresses and mapping the non-contiguous set of private network addresses to a contiguous sequence of identifiers for the private addresses;

distributing network packets to the plurality of NAT modules; and with each of the NAT modules, locally performing deterministic NAT on the network packets received by the NAT module based on the contiguous sequence of identifiers for the public addresses and the contiguous sequence of identifiers for the private addresses mapped by the NAT module.

2. The method of claim 1, wherein locally performing deterministic NAT with each of the NAT modules comprises:

mapping, for each of the packets, the private network address of the packet to one of the identifiers for the private addresses of the NAT module;

applying a deterministic NAT algorithm to deterministically compute, with the NAT module, one of the sequential identifiers for the public addresses and a range of ports based on the sequential identifier for the private address;

mapping the computed one of the sequential identifiers for the public addresses to one of the non-contiguous public network addresses;

dynamically selecting an unused port from the range of ports;

generating a translated packet from the packet, wherein the translated packet includes the determined public network address and the selected unused port from the range of ports in place of the private source address and source port; and forwarding the translated packet from the network device to a public network.

3. The method of claim 1, wherein distributing network packets across the plurality of NAT modules comprises:

receiving a packet from a subscriber, wherein the packet includes a private source network address and source port;

performing a modulo operation on the private source network address using a number of the NAT modules as an operand to the module operation;

selecting one of the plurality of NAT modules based on a result of the modulo operation; and forwarding the packet to the selected one of the plurality of NAT modules.

4. The method of claim 1, wherein distributing network packets across the plurality of NAT modules comprises:

receiving a packet from a subscriber, wherein the packet includes a private source network address and source port;

performing a hash operation on the private source network address;

selecting one of the plurality of NAT modules based on a result of the hash operation; and forwarding the packet to the selected one of the plurality of NAT modules.

5. The method of claim 1, wherein allocating a non-contiguous set of private network addresses of a private network to each of the NAT modules comprises:

performing a modulo operation on each of the private source network addresses using a number of the NAT modules as on operand to the module operation; and assigning each of the private source network addresses to one of the plurality of NAT modules based on a result of the modulo operation.

6. The method of claim 1, wherein hosting a non-contiguous set of public network addresses on each of the NAT modules comprises:

performing a modulo operation on each of the public network addresses using a number of the NAT modules as on operand to the module operation; and assigning each of the public network addresses to one of the plurality of NAT modules based on a result of the modulo operation.

7. The method of claim 1, wherein the plurality of NAT modules comprise a plurality of session management cards within the network device, and wherein distributing the network packets across the plurality of NAT modules comprises load balancing the network packets across the session management cards.

8. The method of claim 7, wherein load balancing the network packets comprises:

receiving the network packets with a forwarding component shared by the session management cards, wherein the network packets comprise outbound network packets from subscribers and destined for a public network;

for each of the outbound network packets, selecting one of the session management cards based on a private network address within the outbound network packet; and forwarding the outbound network packet from the forwarding component of the network device to the selected session management card for network address translation.

9. The method of claim 7, wherein load balancing the network packets comprises:

installing a plurality of routes within a forwarding component shared by the session management cards, wherein the routes specify corresponding session management cards as destinations for the network packets specifying the public network addresses as destination addresses;

receiving the network packets with a forwarding component shared by the session management cards, wherein the network packets comprise inbound network packets from a public network;

for each of the inbound network packets, performing a lookup operation with the forwarding component to identify a route for the packet based on a public network address within the inbound packet;

with the forwarding component, selecting one of the session management cards based the identified route; and forwarding the inbound network packet from the forwarding component of the network device to the selected session management card for network address translation.

10. The method of claim 7, wherein the network device comprises a router or a mobile gateway.

11. A network device comprising:

a plurality of interfaces configured to send and receive network packets for subscribers of a service provider network;

a plurality of session management cards that each host a non-contiguous set of public network addresses;

a forwarding component to distribute the network packets to the session management cards;

a NAT controller within each of the plurality of session management cards, wherein each of the NAT controllers maps the non-contiguous set of public network addresses to a contiguous sequence of identifiers for the public addresses and maps a non-contiguous set of private network addresses to a contiguous sequence of identifiers for the private addresses, and wherein each of the NAT controllers performs deterministic network address translation on the network packets received by the respective session management card based on the contiguous sequence of identifiers for the public addresses and the contiguous sequence of identifiers for the private addresses mapped by the NAT controller to output a translated packet.

12. The network device of claim 11,
wherein each of the NAT controllers is configured to perform deterministic NAT upon receiving an outbound packet from one of the subscribers and destined for a public network by:
(i) mapping a private network address of the packet to one of the identifiers for the private addresses and apply a deterministic NAT algorithm to deterministically compute one of the sequential identifiers for the public addresses and a range of ports based on the sequential identifier for the private address,
(ii) mapping the computed one of the sequential identifiers for the public addresses to one of the non-contiguous public network addresses hosted by the respective session management card, and
(iii) selecting an unused port from the range of ports and generates the translated packet from the packet to include the determined public network address and the selected unused port from the range of ports in place of the private source address and source port.

13. The network device of claim 11,
wherein the packets include outbound packets that each include a private source network address and a source port, and
wherein, for each of the outbound packets, the forwarding component performs a modulo operation on the private source network address using a number of the session management cards as on operand to the module operation, selects one of the plurality of session management cards based on a result of the modulo operation and distributes the packet to the selected one of the session management cards.

14. The network device of claim 11, further comprising a control unit that allocates the non-contiguous set of private network addresses to each of the session management cards by performing a modulo operation on each of the private source network addresses using a number of the session management cards as on operand to the module operation and assigning each of the private source network addresses to one of the session management cards based on a result of the modulo operation.

15. The network device of claim 14, wherein the control unit allocates the noncontiguous set of public network addresses to each of the session management cards by performing a modulo operation on each of the public network addresses using a number of the session management cards as on operand to the module operation and assigning each of the public network addresses to one of the plurality of session management cards based on a result of the modulo operation.

16. The network device of claim 11,
wherein the forwarding component is programmed with a plurality of routes that specify the session management cards as destinations for the public network addresses, and
wherein the forwarding component receives inbound network packets from a public network and, for each of the inbound network packets, performs a lookup operation to identify a route for the inbound packet based on a public network address within the inbound packet, select one of the session management cards based the identified route and forward the inbound network packet to the selected session management card for network address translation.

17. A network router comprising:
a plurality of interfaces configured to send and receive packets for subscribers of a service provider network, wherein each of the subscribers is associated with a private network address;
a plurality of session management cards to manage subscriber communication sessions associated with the subscribers;
a control unit that executes a routing protocol to maintain routing information specifying routes, wherein the control unit allocates to each of the session management cards a non-contiguous set of public network addresses and a non-contiguous set of the private network addresses;
a forwarding component configured by the routing engine to select next hops for the packets in accordance with the routing information, the forwarding component comprising a switch fabric to forward the packets to the between the interfaces and the session management cards;
wherein each of the session management cards locally map the non-contiguous set of public network addresses to an internal contiguous sequence of identifiers for the public addresses and map the non-contiguous set of private network addresses to an internal contiguous sequence of identifiers for the private addresses, and
wherein each of the session management cards perform deterministic network address translation (NAT) on the packets based on the contiguous sequence of identifiers for the public addresses and the contiguous sequence of identifiers for the private addresses internal to the session management card.

18. The router of claim 17,
wherein the forwarding component is programmed by the routing engine to store forwarding information of a plurality of routes that specify the session management cards as destinations for the public network addresses, and
wherein the forwarding component receives inbound network packets from a public network and, for each of the inbound network packets, performs a lookup operation to identify a route for the inbound packet based on a public network address within the inbound packet, select one of the session management cards based the identified route and forward the inbound network packet to the selected session management card for network address translation.

* * * * *